United States Patent
Sawhney et al.

(10) Patent No.: US 8,938,782 B2
(45) Date of Patent: Jan. 20, 2015

(54) SYSTEMS AND METHODS FOR PROVIDING NETWORK ACCESS CONTROL IN VIRTUAL ENVIRONMENTS

(75) Inventors: Sanjay Sawhney, Cupertino, CA (US); Matthew Conover, East Palo Alto, CA (US); Bruce Montague, Santa Cruz, CA (US)

(73) Assignee: Symantec Corporation, Mountain View, CA (US)

( * ) Notice: Subject to any disclaimer, the term of this patent is extended or adjusted under 35 U.S.C. 154(b) by 559 days.

(21) Appl. No.: 12/724,414

(22) Filed: Mar. 15, 2010

(65) Prior Publication Data

US 2011/0225624 A1  Sep. 15, 2011

(51) Int. Cl.
  *G06F 21/00* (2013.01)
  *G06F 9/455* (2006.01)
  *G06F 21/53* (2013.01)

(52) U.S. Cl.
  CPC ............ *G06F 9/45558* (2013.01); *G06F 21/53* (2013.01); *G06F 2009/45587* (2013.01)
  USPC ....................... 726/3; 713/164; 718/1; 726/12

(58) Field of Classification Search
  CPC ................ G06F 9/45558; G06F 9/455; G06F 2009/45587; G06F 21/56; G06F 21/51; G06F 21/577
  See application file for complete search history.

(56) References Cited

U.S. PATENT DOCUMENTS

| | | | |
|---|---|---|---|
| 7,191,441 B2 | 3/2007 | Abbott et al. | |
| 7,647,589 B1 | 1/2010 | Dobrovolskiy et al. | |
| 8,225,317 B1 | 7/2012 | Chiueh et al. | |
| 2004/0103310 A1* | 5/2004 | Sobel et al. | 713/201 |
| 2006/0130060 A1 | 6/2006 | Anderson et al. | |
| 2006/0136720 A1* | 6/2006 | Armstrong et al. | 713/164 |
| 2006/0248581 A1* | 11/2006 | Sundarrajan et al. | 726/12 |
| 2007/0230504 A1 | 10/2007 | Smith et al. | |
| 2008/0134175 A1 | 6/2008 | Fitzgerald et al. | |
| 2008/0282241 A1 | 11/2008 | Dong | |
| 2009/0007100 A1* | 1/2009 | Field et al. | 718/1 |
| 2009/0007218 A1 | 1/2009 | Hubbard | |
| 2009/0019437 A1* | 1/2009 | Feng et al. | 718/1 |

(Continued)

FOREIGN PATENT DOCUMENTS

JP   2008077558   4/2008

OTHER PUBLICATIONS

"Code Injection From the Hypervisor: Removing the need for in-guest agents" (2009); 36 pages; originally downloaded from http://www.blackhat.com/presentations/bh-usa-09/CONOVER/BHUSA09-Conover-SADEintoVM-SLIDES.pdf.*

(Continued)

*Primary Examiner* — Carl G. Colin
*Assistant Examiner* — Syed Zaidi
(74) *Attorney, Agent, or Firm* — ALG Intellectual Property, LLC

(57) ABSTRACT

A computer-implemented method for providing network access control in virtual environments. The method may include: 1) injecting a transient security agent into a virtual machine that is running on a host machine; 2) receiving, from the transient security agent, an indication of whether the virtual machine complies with one or more network access control policies; and 3) controlling network access of the virtual machine based on the indication of whether the virtual machine complies with the one or more network access control policies. Various other methods, systems, and computer-readable media are also disclosed herein.

20 Claims, 9 Drawing Sheets

(56) References Cited

U.S. PATENT DOCUMENTS

| | | | |
|---|---|---|---|
| 2009/0241109 A1* | 9/2009 | Vandegrift et al. | 718/1 |
| 2009/0328030 A1* | 12/2009 | Fries | 717/174 |
| 2010/0138815 A1 | 6/2010 | Schneider | |
| 2011/0126207 A1 | 5/2011 | Wipfel et al. | |
| 2011/0154325 A1 | 6/2011 | Terasaki | |

OTHER PUBLICATIONS

Sailer, R.; Jaeger, T.; Valdez, E.; Caceres, R.; Perez, R.; Berger, S.; Griffin, J.L.; van Doorn, L.; , "Building a MAC-based security architecture for the Xen open-source hypervisor," Computer Security Applications Conference, 21st Annual, vol., no., pp. 10 pp. 285, Dec. 5-9, 2005.*

N. A. Quynh and K. Suzaki. Xenprobe: A lightweight user-space probing framework for xen virtual machine. In Proceedings of the USENIX Annual Technical Conference, 2007.*

P. Pazandak. ProbeMeister: Distributed Runtime Software Instrumentation. Submitted for the Workshop on Unanticipated Software Evolution (USE 2002), held at ECOOP 2002.*

International Search Report and Written Opinion received in PCT Application No. PCT/US2010/062194 on Mar. 30, 2011.

Chiueh, T. et al.; "Stealthy Deployment and Execution of In-Guest KernelAgents"; Internet Citation; Aug. 1, 2009; pp. 1-12; Retrieved from internet: http://www.blackhat.com/presentations/bh-usa-09/CONOVER/BHUSA09-Conover-SADEintoVM-PAPER.pdf; retrieved on Mar. 22, 2011.

Tim Greene; NAC has a Virtual Problem; http://www.networkworld.com/newsletters/vpn/2008/0317nac.1.html; Taken from site on Jan. 21, 2010.

PR Newswire; IBM Acts to Enhance Security of Virtual Environments; http://www.prnewswire.com/news-release/ibm-acts-to-enhance-security-of-virtual-environments; Taken from site Jan. 21, 2010.

Ashlesha Joshi, et al.; Detecting Past and Present Intrusions through Vulnerability-Specific Predicates; SOSP'05; Oct. 23-26, 2005; ACM; Brighton, United Kingdom.

Tal Garfinkel, et al.; Terra: A Virtual Machine-Based Platform for Trusted Computing; SOSP'03: Proceedings of the Nineteenth ACM Symposium on Operating Systems Principles; Oct. 19-22, 2003; ACM; Bolton Landing, New York, USA.

Bryan D. Payne, et al.; Lares: An Architecture for Secure Active Monitoring Using Virtualization; Proceedings of the 2008 IEEE Symposium on Security and Privacy; 2008.

Peter Ferrie, et al.; Virus Analysis 1—Worm Wars; Virus Bulletin; Oct. 2003; pp. 5-8; www.virusbtn.com.

Vitaly Shmatikov; Malware: Worms and Botnets; 2011; http://www.cs.utexas.edu/~shmat/courses/cs378_spring11/botnets.pdf.

Rachit Mathur, et al.; Analysing the Packer Layers of Rogue Anti-Virus Programs; Virus Bulletin Conference Oct. 2011; Oct. 2011; pp. 155-160.

William E. Sobel, et al.; Methods and Systems for Injecting Endpoint Management Agents into Virtual Machines; U.S. Appl. No. 12/938,039, filed Nov. 2, 2010.

* cited by examiner

SYSTEMS AND METHODS FOR PROVIDING NETWORK ACCESS CONTROL IN VIRTUAL ENVIRONMENTS

BACKGROUND

The managed state of an organization's individual endpoints may play a critical role in the overall security and availability of its Information Technology ("IT") infrastructure and related business operations. The new wave of sophisticated crimeware not only targets specific companies, but may also target desktops and laptops as backdoor entryways into those enterprises' business operations and valuable resources. To safeguard themselves against these targeted threats, organizations may need to have a means to guarantee that each endpoint continually complies with corporate security and configuration management policies. Failure to guarantee endpoint policy compliance may leave organizations vulnerable to a wide array of threats. These threats may include the proliferation of malicious code throughout the enterprise, disruption of business-critical services, increased IT recovery and management costs, exposure of confidential information, damage to corporate brand, and/or regulatory fines due to non-compliance.

Network-access-control technologies may enable organizations to ensure the proper configuration and security state of user endpoints—including those of on-site employees, remote employees, guests, contractors, and temporary workers—before they are allowed to access resources on the corporate network. Network-access-control technologies may discover and evaluate endpoint compliance status, provision the appropriate network access, and provide for mediation capabilities to ensure that endpoint security policies and standards are met.

Virtualized environments may pose difficult security challenges in an enterprise environment. Since virtual machines are relatively easy to create, clone, store, and move, they can easily be out of compliance with corporate policies (such as not having the approved versions of software and patch levels). It may be unsafe to allow such virtual machines to launch with network connectivity in an enterprise's network. What is needed, therefore, are more efficient and effective mechanisms for providing network-access-control in virtual environments.

SUMMARY

As will be described in greater detail below, the instant disclosure generally relates to systems and methods for providing network access control in virtual environments. Embodiments of the instant disclosure may provide network access control in virtual environments in a variety of ways. For example, a method for providing network access control in virtual environments may include: 1) injecting a transient security agent into a virtual machine that is running on a host machine; 2) receiving, from the transient security agent, an indication of whether the virtual machine complies with one or more network access control policies; and 3) controlling network access of the virtual machine based on the indication of whether the virtual machine complies with the one or more network access control policies.

In some embodiments, the transient security agent may be injected into the virtual machine by an injection module on the host machine. Injecting the transient security agent into the virtual machine may include: 1) inserting, into an exception handler memory location of the virtual machine, one or more computer-executable instructions configured to facilitate transfer of control from the virtual machine to the injection module; 2) triggering an exception during execution of the virtual machine to cause the one or more computer-executable instructions in the exception handler memory location to be executed; 3) obtaining control from the virtual machine after the at least one computer-executable instruction executes; and 4) inserting the transient security agent into the virtual machine.

According to various embodiments, the indication of whether the virtual machine complies with the one or more network access control policies may be received at a network access control module on the host machine. In such embodiments, the indication of whether the virtual machine complies with the one or more network access control policies may be sent to the network access control module via an inter-process communication. The network access control module may include a network communication filter that controls network access of the virtual machine based on the indication of whether the virtual machine complies with the one or more network access control policies.

In at least one embodiment, the indication of whether the virtual machine complies with the one or more network access control policies is received at a network access control server that is remote from the host machine, and the network access control server may control network access of the virtual machine based on the indication of whether the virtual machine complies with the one or more network access control policies.

According to one or more embodiments, the method may further include removing the transient security agent from the virtual machine. The transient security agent may be removed from the virtual machine when the virtual machine no longer needs network access or at any other time.

As a second example of providing network access control in virtual environments, a method may include: 1) providing a security agent in a virtual machine that is running on a host machine; 2) providing a network communication filter that resides on the host machine but is external to the virtual machine; 3) receiving, at an access control module that controls the network communication filter, an indication of whether the virtual machine complies with one or more network access control policies, the indication being sent from the security agent to the access control module via an inter-process communication; and 4) using the network communication filter to control network access of the virtual machine based on the indication of whether the virtual machine complies with the one or more network access control policies.

In some embodiments, providing the security agent in the virtual machine may include injecting the agent into the virtual machine. An injection module on the host machine may inject the agent into the virtual machine. Additionally or alternatively, providing the security agent in the virtual machine may include installing the agent on the virtual machine. The security agent may be installed on the virtual machine using an installation process of the virtual machine.

According to various embodiments, the indication of compliance may be sent from the security agent to the access control module via an inter-virtual-machine communication. Alternatively, the indication of compliance may be sent from the security agent to the access control module by storing the indication in a memory location shared by the security agent and the access control module.

In certain embodiments, the indication of compliance may indicate that the virtual machine is not in compliance with the one or more network access control policies, and the access control module may use the network communication filter to control network access of the virtual machine by blocking one or more network communications of the virtual machine. In such situations, the method may include remediating the virtual machine to bring the virtual machine into compliance with the one or more network access control policies. The network communication filter may allow the virtual machine access to one or more network resources used to remediate the virtual machine.

As a third example of providing network access control in virtual environments, a method may include: 1) identifying a virtual machine running on a host machine; 2) providing a network communication filter that resides on the host machine and is external to the virtual machine; 3) inspecting, using a process executing on the host machine and external to the virtual machine, one or more resources of the virtual machine to determine whether the virtual machine complies with one or more network access control policies; 4) receiving, at an access control module that controls the network communication filter, an indication of whether the virtual machine complies with the one or more network access control policies; and 5) using the network communication filter to control network access of the virtual machine based on the indication of whether the virtual machine complies with the one or more network access control policies.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
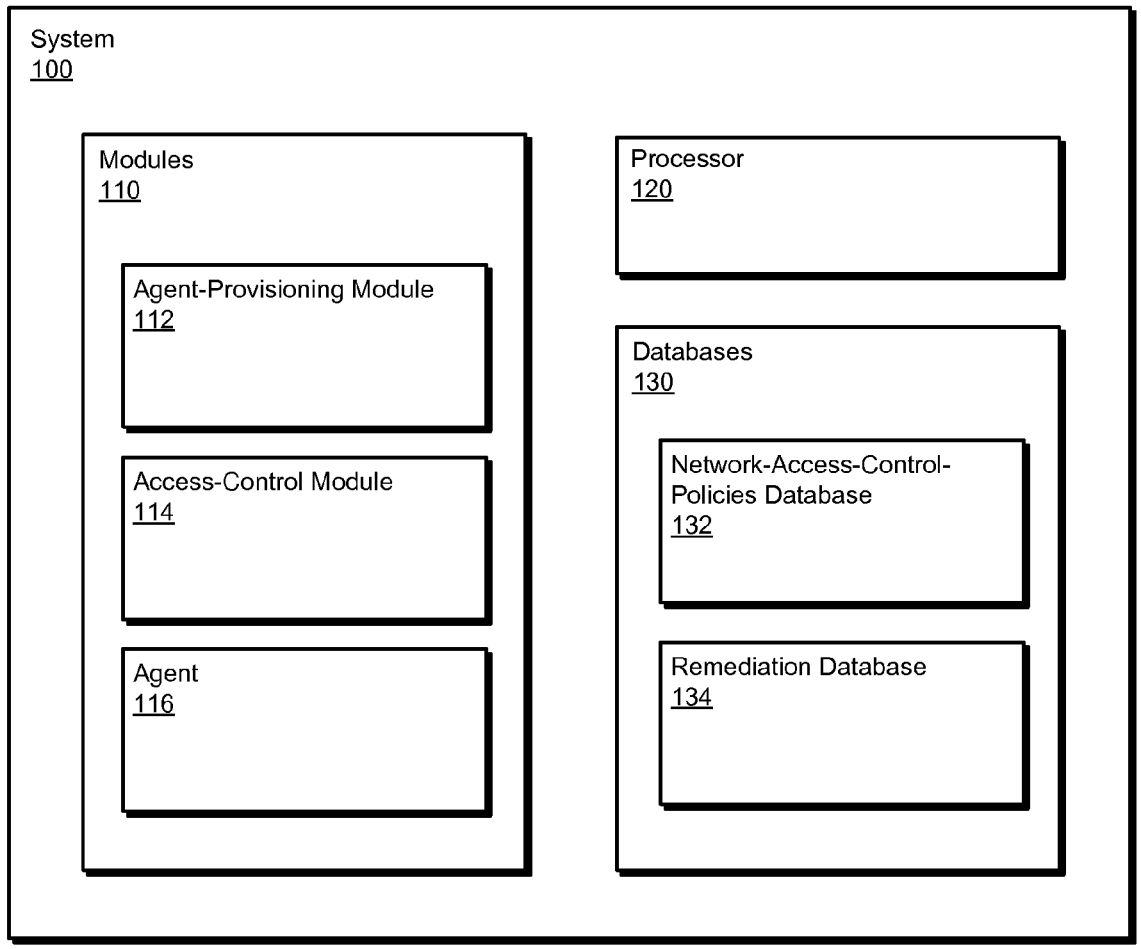
FIG. 1 is a block diagram of an exemplary system for providing network access control in virtual environments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for providing network access control in virtual environments. Systems and methods described herein may provide network access control in a variety of ways. For example, a security agent may be injected or installed into a virtual machine running on a host machine to evaluate the virtual machine for compliance with access control policies. The security agent may use inter-process and/or network communications to communicate with a network access control system on the host machine and/or on a remote server. The network access control system may, based on information provided by the security agent, control network access of the virtual machine using a network communication filter and/or any other suitable mechanism. In some embodiments, instead of using a security agent in the virtual machine, the network access control system on the host machine may inspect resources of the virtual machine to determine whether the virtual machine complies with access control policies.

The following will provide, with reference to FIGS. 1-3, and 6, detailed descriptions of exemplary systems for providing network access control in virtual environments. Detailed descriptions of corresponding computer-implemented methods will also be provided in connection with FIGS. 4, 5, and 7. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for providing network access control in virtual environments. As illustrated in this figure, exemplary system 100 may include one or more modules 110 for performing one or more tasks. For example, and as will be explained in greater detail below, exemplary system 100 may include an agent-provisioning module 112 programmed to provide a virtual machine with a network access-control security agent through injection, installation, or any other process for provisioning a security agent to a virtual machine.

Exemplary system 100 may also include an access-control module 114 programmed to provide various network access control functions. In other words, access-control module 114 may act as a gate or door that permits or denies virtual machines access to the network. In some embodiments, access-control module 114 may enforce endpoint security policies on the virtual machine. For example, if a virtual machine does not comply with network security policies, access-control module 114 may block or quarantine the virtual machine from accessing the network and network resources. In some embodiments, access-control module 114 may use a network communication filter on a machine that hosts a virtual machine to control network access of the virtual machine. Alternatively, access-control module 114 may be part of a remote access-control server that controls network access of a virtual machine.

Access-control module 114 may also perform remediation of a virtual machine if the virtual machine is not compliant with network policies. In some embodiments, the remediation may be fully transparent to a user of virtual machine. In other embodiments, access-control module 114 may provide remediation information to a user for manual remediation.

Exemplary system 100 may include an agent 116, which may implement end-point evaluation technologies that assess the state (checks for compliance with policy) of an endpoint (e.g., a virtual machine). For example, agent 116 may check a virtual machine for antivirus software, anti-spyware software, installed patches, and various other security settings. In some embodiments, agent 116 may test the integrity of a virtual machine against pre-defined templates, determining whether the virtual machine has the required patch levels, service packs, antivirus program and/or definitions, and/or firewall status indicated in such templates. Additionally or alternatively, agent 116 may use custom-created checks (e.g., policies created by an administrator) to determine whether a virtual machine is network-access-control compliant.

Agent 116 may include any type or form of computer-executable code capable of analyzing a virtual machine for compliance with network-access-control policies. For example, agent 116 may be implemented as operating system executable code (e.g., a WINDOWS .exe) or an operating system specific script (e.g., a LINUX or WINDOWS shell script).

In certain embodiments, one or more of modules 110 in FIG. 1 may represent one or more software applications or programs that, when executed by a computing device, may cause the computing device to perform one or more tasks. For example, as will be described in greater detail below, one or more of modules 110 may represent software modules stored and configured to run on one or more computing devices, such as the system illustrated in FIG. 2, one or more of the systems illustrated in FIG. 3, the system illustrated in FIG. 6, computing system 810 in FIG. 8, and/or portions of exemplary network architecture 900 in FIG. 9. One or more of modules 110 in FIG. 1 may also represent all or portions of one or more special-purpose computers configured to perform one or more tasks.

System 100 may include a processor 120 for executing one or more of modules 110. Processor 120 of system 100 may include one or more microprocessors and/or central processing units configured to execute one or more instructions of one or more of modules 110. For example, processor 120 may include processor 814 in FIG. 8.

As illustrated in FIG. 1, exemplary system 100 may also include one or more databases 130. Databases 130 may represent portions of a single database or computing device or a plurality of databases or computing devices. In one embodiment, exemplary system 100 may include a network-access-control-policies database 132 for storing one or more network access control policies. Network-access-control-policies database 132 may include one or more rules indicating the required antivirus software, anti-spyware, installed patches, user's allowed to access the network, and/or various other security settings required for a virtual machine to be allowed to access a network.

Databases 130 may also include a remediation database 134. Remediation database 134 may include one or more patches, antivirus software definitions, anti-spyware applications, and/or any other software that may need to be provided to a virtual machine to bring the virtual machine into compliance with one or more network access control policies.

Databases 130 in FIG. 1 may represent a portion of one or more computing devices. For example, databases 130 may represent a portion of system 200 in FIG. 2, network access control server 306 in FIG. 3, host machine 602 in FIG. 6, computing system 810 in FIG. 8, and/or portions of exemplary network architecture 900 in FIG. 9. Alternatively, databases 130 in FIG. 1 may represent one or more physically separate devices capable of being accessed by a computing device, such as system 200 in FIG. 2, network access control server 306 in FIG. 3, host machine 602 in FIG. 6, computing system 810 in FIG. 8, and/or portions of exemplary network architecture 900 in FIG. 9.

Exemplary system 100 in FIG. 1 may be deployed in a variety of ways. For example, all or a portion of exemplary system 100 may represent portions of a cloud-computing or network-based environment, such as exemplary system 300 illustrated in FIG. 3. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In other embodiments, exemplary system 100 may be implemented on a single host machine. For example, FIG. 2 shows how system 100 may be implemented on various virtual machines of a host machine.

Figure 2:
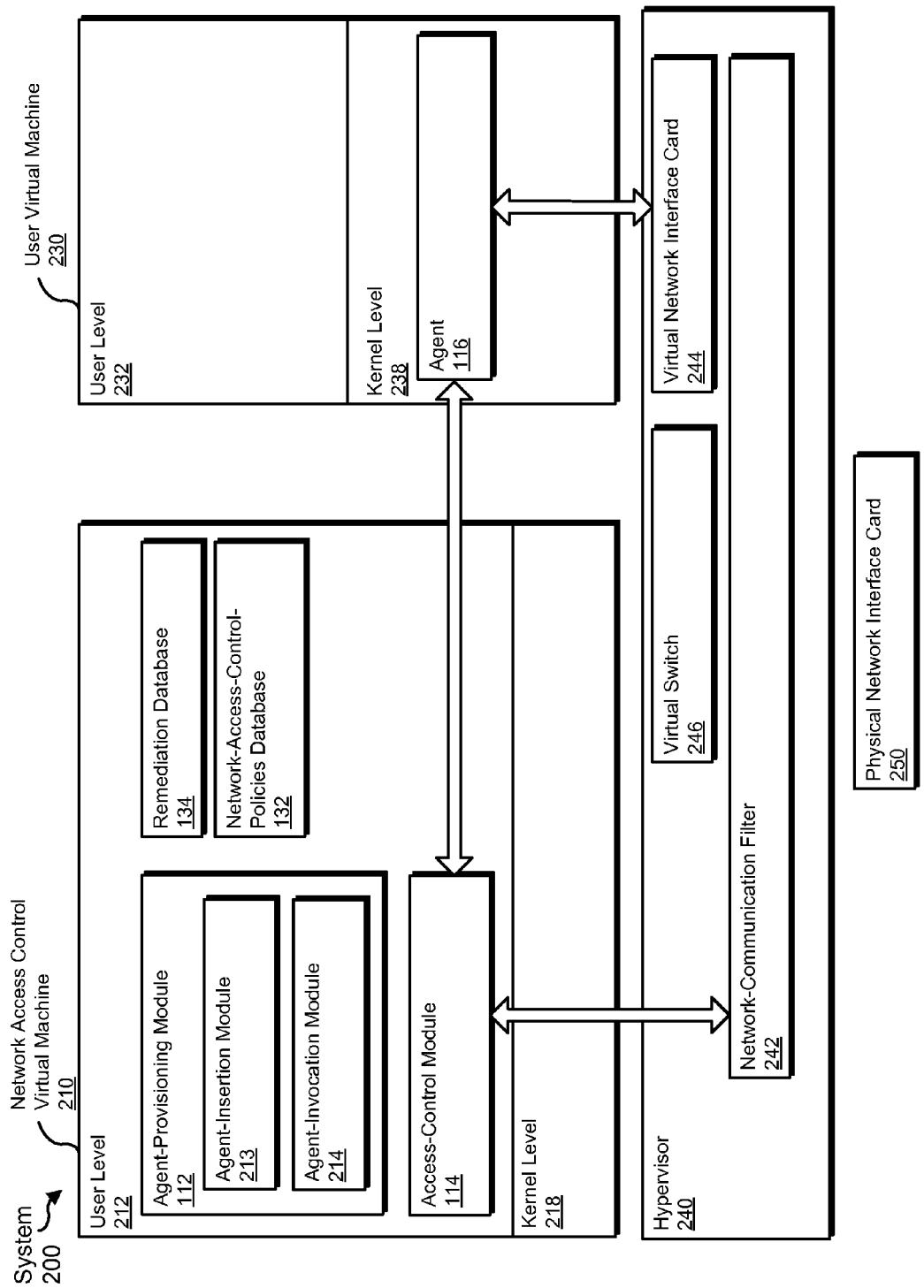
FIG. 2 is a block diagram of an exemplary system for providing network access control in virtual environments by providing security agents in virtual machines.

FIG. 2 shows an exemplary system 200 for providing network access control in virtualized environments. System 200 may include a network access control virtual machine 210 and a user virtual machine 230 running on a hypervisor 240. Network access control virtual machine 210 may include a user level 212 and a kernel level 218. User level 212 may include agent-provisioning module 112 and access-control module 114. As shown, agent-provisioning module 112 may include an agent-insertion module 213, which may be programmed to perform one or more of the steps involved in inserting an agent into a virtual machine. Agent-provisioning module 112 may also include an agent-invocation module 214, which may be programmed to perform one or more of the steps involved in invoking an agent in a virtual machine. User level 212 may also include remediation database 134 and network access-control-policies database 132.

One or more of the modules in user level 212 may run in domain 0 (e.g., the first domain launched when a system 200 is booted). In some embodiments, one or more of the modules provided in user level 212 may comprise a network access control server (e.g., a security appliance). Such a network access control server may provide network access control for one or more virtual machines running on system 200, such as user virtual machine 230.

As shown in FIG. 2, user virtual machine 230 may include a user level 232 and a kernel level 238. Kernel level 238 may include agent 116, which may be injected into user virtual machine 230 by agent-insertion module 213. Access-control module 114 in network access control virtual machine 210 may communicate with agent 116 to evaluate user virtual machine 230 for compliance with network access control policies.

User virtual machine 230 and network access control virtual machine 210 may run on hypervisor 240. Hypervisor 240 may include any suitable virtualization software, such as VMWARE, Oracle VM, ESX server, XEN, HYPER-V, LYNXSECURE, TRANGO, IBM POWER, KVM, and/or any other suitable hypervisor. Hypervisor 240 may include a network-communication filter 242 that intercepts, blocks, allows, modifies, and/or otherwise handles network packets from user virtual machine 230. For example, network-communication filter 242 may monitor and intercept communications from network interfaces, such as virtual network interface card 244. Network-communication filter 242 may filter network communications from user virtual machine 230 to provide network access control for user virtual machine 230. Examples of network-communication filter 242 include, without limitation, XEN's dom0 filter, VMWARE's dvFilter, and/or HYPER-V's NDIS filter library.

Hypervisor 240 may also provide a virtual switch 246, which may include a logical switching fabric that enables virtual machines, such as network access control virtual machine 210 and user virtual machine 230, to communicate. As shown, system 200 may also include a physical network interface card 250 that enables network access control virtual machine 210 and/or user virtual machine 230 to communicate with external devices.

Figure 3:
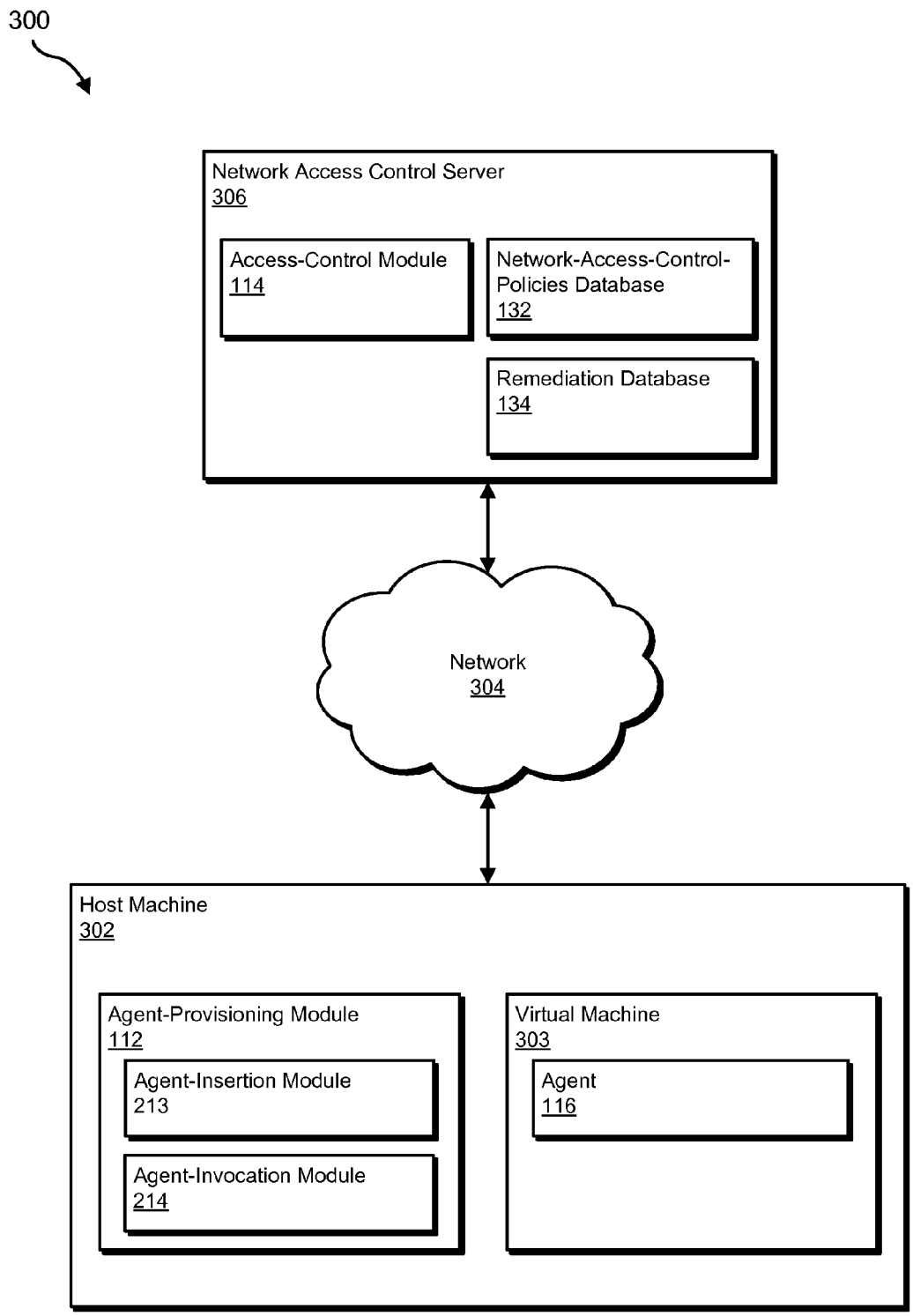
FIG. 3 is a block diagram of another exemplary system for providing network access control in virtualized environments by providing security agents in virtual machines.

While FIG. 2 provides an example of an on-host network-access-control server that may be implemented independent of the need for 802.1x communications, some embodiments of the instant disclosure may be implemented in an environment with a remote network-access-control server. For example, FIG. 3 shows a system 300 with a network access control server 306 remote from a host machine 302. Host machine 302 may include agent-provisioning module 112 and a virtual machine 303. Agent-provisioning module 112 may include agent-insertion module 213 and agent-invocation module 214, and virtual machine 303 may include agent 116.

Host machine 302 generally represents any type or form of computing device capable of reading computer-executable instructions. Examples of host machine 302 include, without limitation, laptops, desktops, servers, cellular phones, personal digital assistants (PDAs), multimedia players, embedded systems, combinations of one or more of the same, exemplary computing system 810 in FIG. 8, or any other suitable computing device.

Network access control server 306 may include access-control module 114, network-access-control-policies database 132, and remediation database 134. Network access control server 306 generally represents any type or form of computing device that is capable of implementing and enforcing network access control for endpoint devices. Examples of network access control server 306 include, without limitation, application servers and database servers configured to provide various database services and/or run certain software applications.

Host machine 302 and network access control server 306 may communicate over a network 304. Network 304 generally represents any medium or architecture capable of facilitating communication or data transfer. Examples of network 304 include, without limitation, an intranet, a wide area network, a local area network, a personal area network, the Internet, power line communications, a cellular network (e.g., a GSM Network), exemplary network architecture 900 in FIG. 9, or the like. Network 304 may facilitate communication or data transfer using wireless or wired connections.

Figure 4:
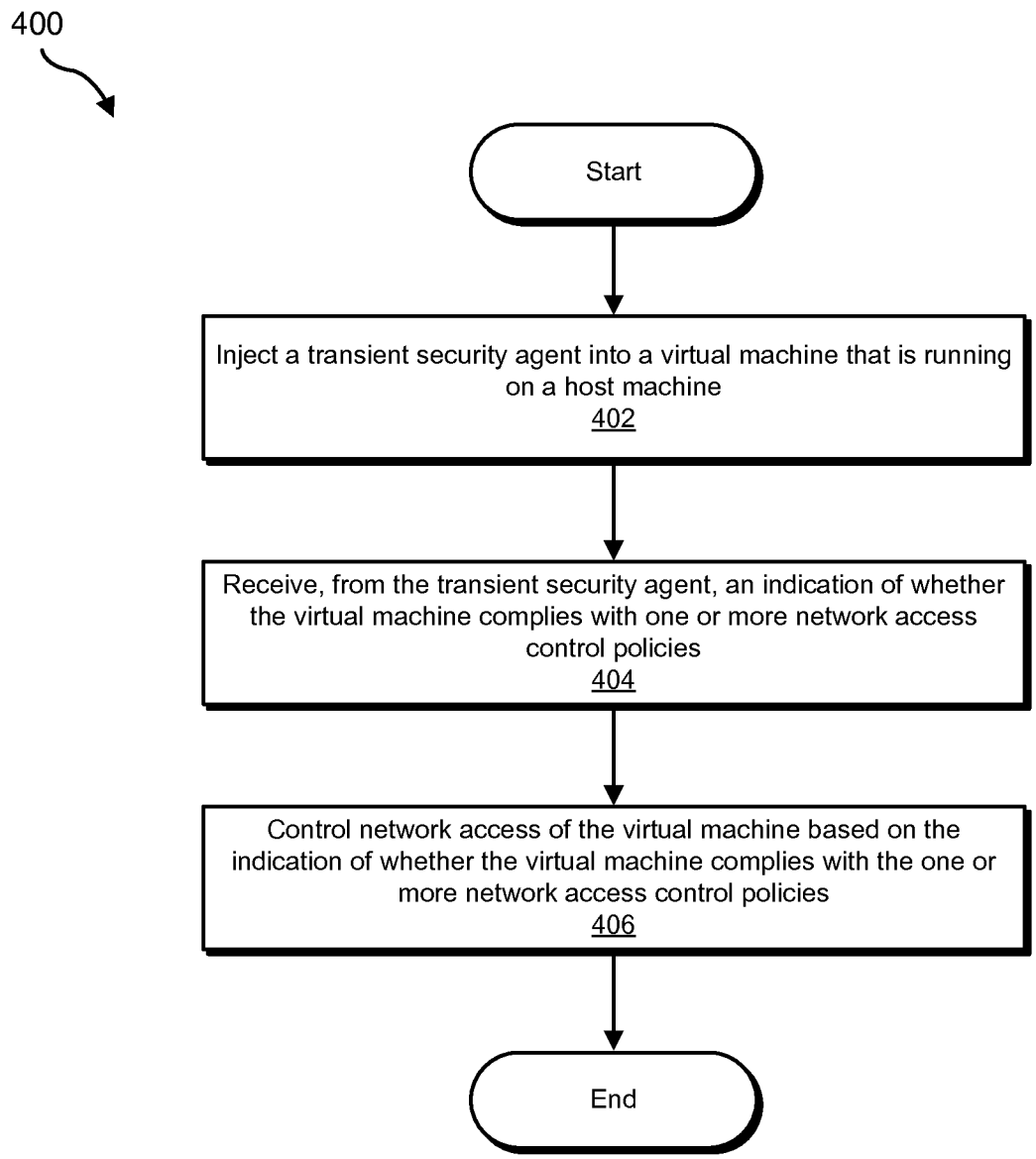
FIG. 4 is a flow diagram of an exemplary method for providing network access control in virtual environments by injecting security agents into virtual machines.

FIG. 4 is a flow diagram of an exemplary computer-implemented method 400 for providing network access control in virtualized environments. The steps shown in FIG. 4 may be performed by any suitable computer-executable code and/or computing systems. In some embodiments, the steps shown in FIG. 4 may be performed by one or more of the components in system 100 of FIG. 1, system 200 of FIG. 2, and/or system 300 of FIG. 3.

At step 402 in FIG. 4, one or more of the systems described herein may inject a transient security agent into a virtual machine that is running on a host machine. For example, agent-insertion module 213 may inject agent 116 into user virtual machine 230. Agent-insertion module 213 may inject agent 116 into user virtual machine 230 in a variety of ways. For example, agent-insertion module 213 may insert, into an exception handler memory location of user virtual machine 230, one or more computer-executable instructions configured to facilitate transfer of control from user virtual machine 230 to agent-insertion module 213.

Agent-insertion module 213 may insert a jump or branch instruction into the exception handler location. The jump instruction may jump to code (e.g., a memory allocation module) that allocates memory for agent 116 and may transfer control to agent-insertion module 213 to allow agent-insertion module 213 to insert agent 116 into user virtual machine 230. The jump instruction may also jump to code that transfers control to agent-insertion module 213 in any other suitable manner. The one or more computer-executable instructions configured to facilitate transfer of control from user virtual machine 230 to agent-insertion module 213 may also include other instructions in addition to or instead of a jump instruction.

Agent-insertion module 213 may also trigger an exception during execution of virtual machine 230 to cause the one or more computer-executable instructions in the exception handler memory location to be executed. Agent-insertion module 213 may trigger the exception in a variety of manners. For example, as will be described below, agent-insertion module 213 may trigger the exception by inserting an instruction that triggers an exception into user virtual machine 230. Embodiments of the instant disclosure may be implemented using any exception that may cause execution to be transferred to a location where a memory-allocation module (or any other code configured to enable insertion of an agent) has been inserted. For example, agent-insertion module 213 may insert an instruction with an invalid opcode into user virtual machine 230 to cause an "invalid opcode" exception. When the instruction with the invalid opcode is executed, control may be transferred to the memory location where the invalid opcode handler is expected to reside (i.e., the location, such as an exception handler location, where agent-insertion module 213 inserted the one or more computer-executable instructions configured to facilitate transfer of control from user virtual machine 230 to agent-insertion module 213).

Agent-insertion module 213 may obtain control from virtual machine 230 after the previously described computer-executable instructions execute on user virtual machine 230. In other words, agent-insertion module 213 may obtain control when agent-insertion module 213 rather than user virtual machine 230 executes on an underlying physical system. In some embodiments, agent-insertion module 213 may obtain control as a direct result of execution of the computer-executable instruction in the exception handler location. In other embodiments, one or more steps may be performed after the instruction in the exception handler location executes and before agent-insertion module 213 obtains control. For example, the instruction in the exception handler memory location may transfer control to an inserted memory-allocation module, and the memory-allocation module may facilitate memory allocation for a region of memory where the agent may be inserted. Then, the memory-allocation module may transfer control to agent-insertion module 213.

After obtaining control from user virtual machine 230, agent-insertion module 213 may insert the agent 116 into user virtual machine 230. For example, agent-insertion module 213 may insert agent 116 into user virtual machine 230 by copying agent 116 into a memory region of user virtual machine 230 allocated by the memory-allocation module.

Thus, agent 116 may be deployed in a manner that is transparent to users and/or does not involve an installation process of user virtual machine 230. In such embodiments, agent 116 may be referred to as a transient agent because it is injected by process external to user virtual machine 230 and is not installed on user virtual machine 230 using a conventional installation mechanism. Since transient agents may not be permanently installed on virtual machines, transient agents may be less susceptible to attacks than permanently installed agents.

Additional details and examples of inserting agents into virtual machines are disclosed in U.S. application Ser. No. 12/477,810, filed 3 Jun. 2009, titled "Methods and Systems for Inserting and Invoking Virtual Appliance Agents," the disclosure of which is incorporated, in its entirety, by this reference.

At step 404 in FIG. 4, one or more of the systems described herein may receive, from the transient security agent, an indication of whether the virtual machine complies with one or more network access control policies. For example, after agent 116 is inserted into user virtual machine 230, agent-invocation module 214 may invoke agent 116 to determine whether user virtual machine 230 complies with one or more network access control policies. Agent 116 may evaluate user virtual machine 230 for compliance and may inform access-control module 114 of whether user virtual machine 230 complies with access control policies.

In some embodiments, the indication of whether user virtual machine 230 complies with one or more network access control policies may be sent via an inter-process communication. For example, the indication may be sent via an inter-virtual machine process (e.g., a communication made via virtual switch 246 using any communication mechanism). As another example, the indication may be communication from agent 116 to access-control module 114 using a shared memory page (e.g., a memory page accessible by both agent 116 and access-control module 114).

Alternatively, the indication of whether a virtual machine complies with the one or more network access control policies may be received at a network access control server that is remote from the host machine, such as in the embodiments shown in FIG. 3.

At step 406 in FIG. 4, one or more of the systems described herein may control network access to the virtual machine based on the indication of whether the virtual machine complies with the one or more network access control policies. In some embodiments, network-communication filter 242 may control network access of user virtual machine 230, as shown in FIG. 2. Additionally or alternatively, access-control module 114 on network access control server 306, as shown in FIG. 3, may control network access of virtual machine 303 at any suitable point in network 304.

In some embodiments, the transient security agent may be removed from the virtual machine. For example, agent 116 may be removed from virtual machine 230 and/or 303 when agent 116 is no longer needed. According to certain embodiments, agent 116 may be removed from a virtual machine when the virtual machine no longer needs network access, after agent 116 evaluates the virtual machine for network-access-control compliance, and/or at any other suitable point in time.

Figure 5:
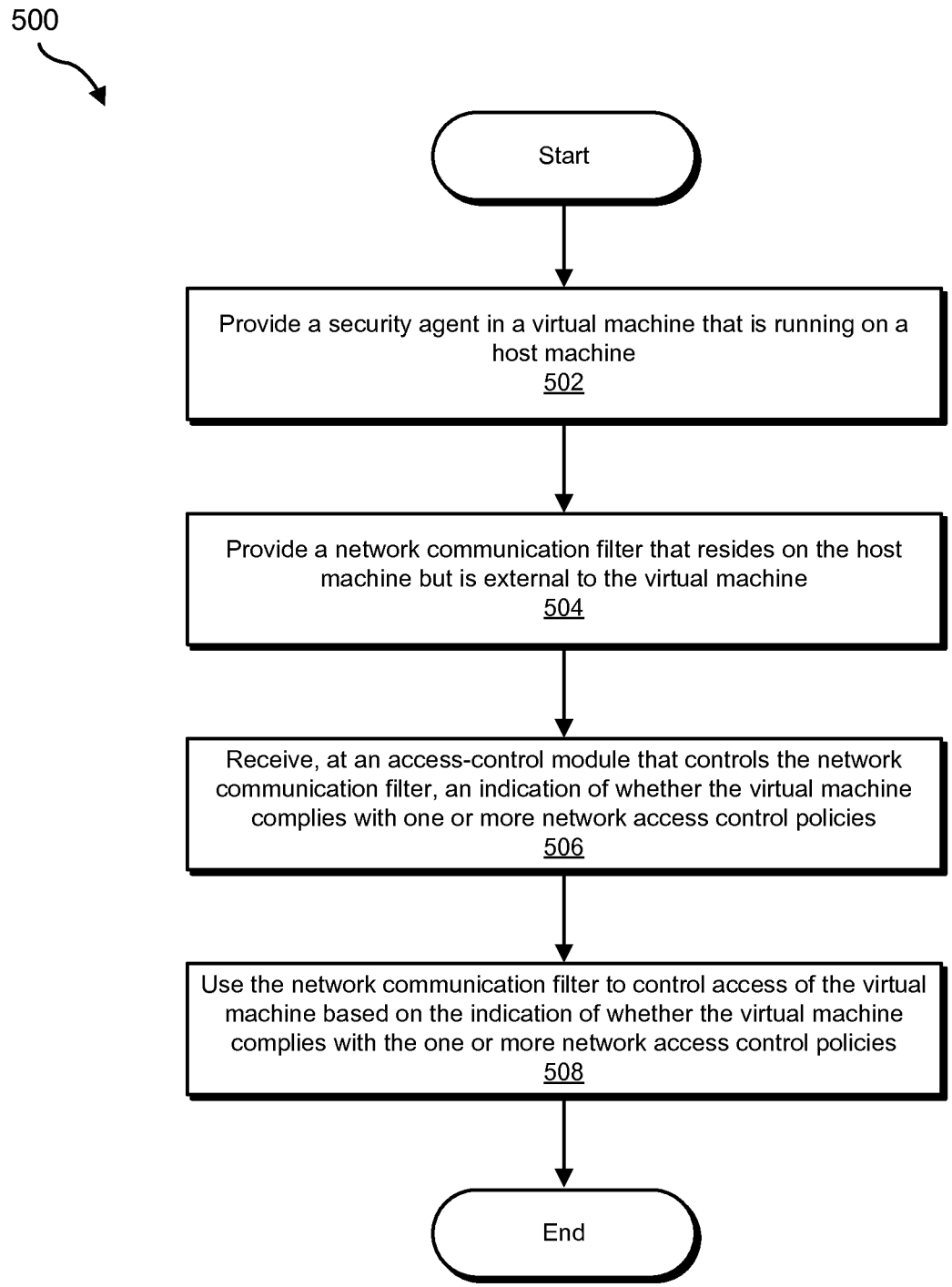
FIG. 5 is a flow diagram of an exemplary method for providing network access control in virtual environments via inter-process communications between security agents and access-control modules.

In some embodiments, a security agent may be provided by injection, as described in the process of FIG. 4. Additionally or alternatively, a security agent may be provided by installation and/or by any other suitable mechanism for providing software in a virtual machine. The process illustrated in FIG. 5 is an example of a process that may be facilitated by a security agent that is injected or installed. FIG. 5 is a flow diagram of an exemplary computer-implemented method 500 for providing network access control in virtualized environments. The steps shown in FIG. 5 may be performed by any suitable computer-executable code and/or computing system. In some embodiments, the steps shown in FIG. 5 may be performed by one or more of the components in system 100 in FIG. 1 and/or system 200 in FIG. 2.

At step 502 in FIG. 5, one or more of the systems described herein may provide a security agent in a virtual machine that is running on a host machine. For example, agent-insertion module 213 may insert agent 116 into user virtual machine 230. Alternatively, agent-provisioning module 112 may prompt user virtual machine 230 to install agent 116 using one or more installation processes of user virtual machine 230. In such embodiments, access-control module 114 may monitor pages of agent 116 to ensure that agent 116 is not tampered with.

At step 504 in FIG. 5, one or more of the systems described herein may provide a network communication filter that resides on the host machine but is external to the virtual machine. For example, access-control module 114 may provide network communication filter 242 residing on system 200 external to user virtual machine 230. A network communication filter may be said to be external to a virtual machine when the network communication filter does not run in the addressable address space of the virtual machine. For example, a network communication filter provided in a hypervisor or any other domain zero process of a host machine may be said to be external to the virtual machine and residing on the host machine.

At step 506 in FIG. 5, one or more of the systems described herein may receive, at an access control module that controls the network-communication filter, an indication of whether the virtual machine complies with one or more network access control policies. For example, access-control module 114 may receive information from agent 116 indicating whether user virtual machine 230 complies with one or more network access control policies. This information may be sent via an inter-process communication. As used herein, the phrase "intra-process communication" generally refers to any communication between two processes on a host system and/or any communication made via any other mechanism for transporting information between two software modules. As previously noted, an inter-process communication may be implemented using shared memory, inter-virtual machine communications, and/or any other suitable inter-module communication mechanism, such as a network stack.

At step 508 in FIG. 5, one or more of the systems described herein may use the network communication filter to control network access of the virtual machine based on the indication of whether the virtual machine complies with the one or more network access control policies. For example, access-control module 114 may use network-communication filter 242 to control network access of user virtual machine 230 based on the indication of whether user virtual machine 230 complies with one or more network access control policies. If the indication indicates that user virtual machine 230 is not in compliance with the one or more network access control policies, network-communication filter 242 may block one or more network communications of the user virtual machine 230.

In some embodiments, access-control module 114 may attempt to remediate the virtual machine to bring the virtual machine into compliance with the network access control policies. In such embodiments, network-communication filter 242 may allow virtual machine 230 access to one or more network resources used to remediate the virtual machine. For example, network-communication filter 242 may allow user virtual machine to 230 to connect to a quarantine server that provides the latest approved software and patches.

Similarly, network-communication filter 242 may also allow the user virtual machine 230 to use a Dynamic Host Configuration Protocol ("DHCP"), a Lightweight Directory Access Protocol ("LDAP"), and/or an active directory technology before determining whether user virtual machine 230 is compliant with network-access-control policies.

Figure 6:
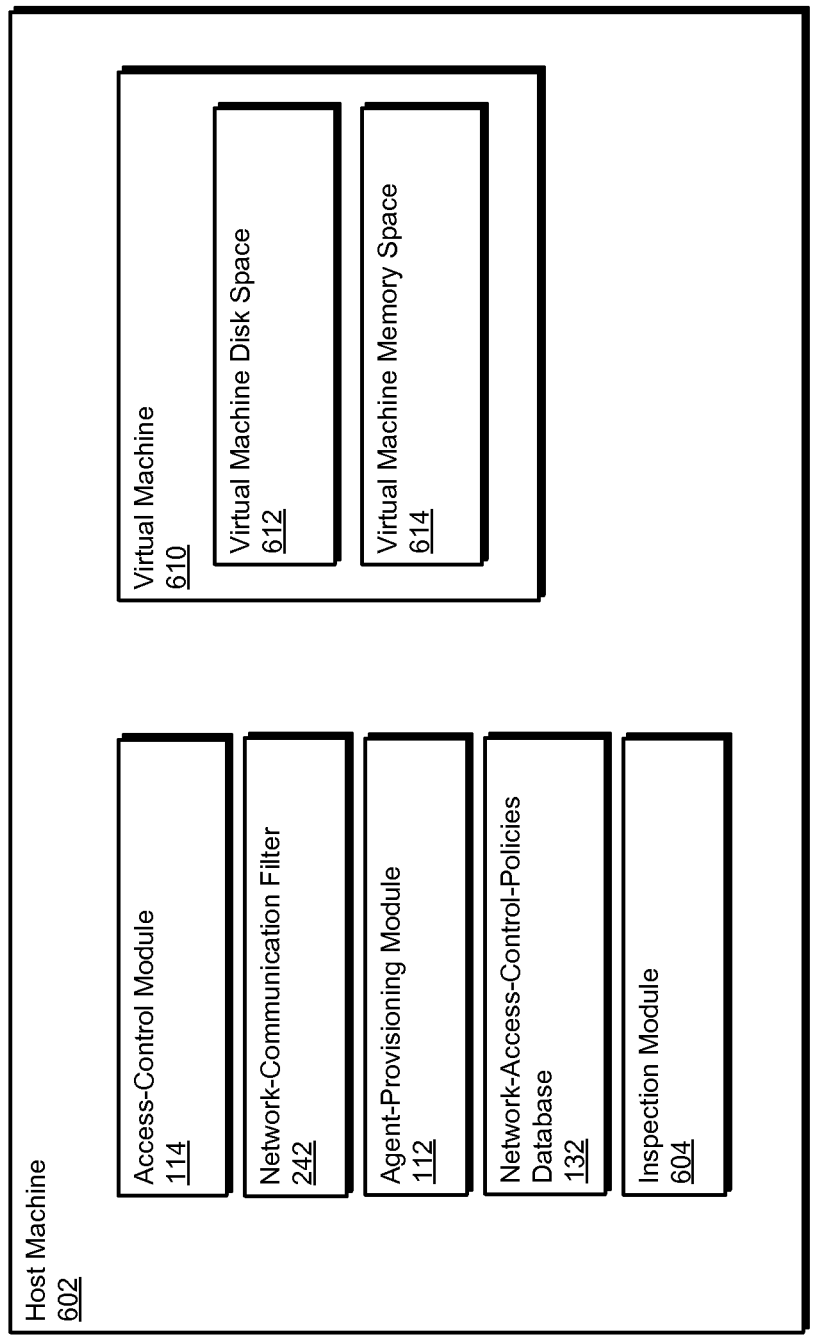
FIG. 6 is a block diagram of an exemplary system for providing network access control in virtual environments by inspecting virtual machine resources.
Figure 7:
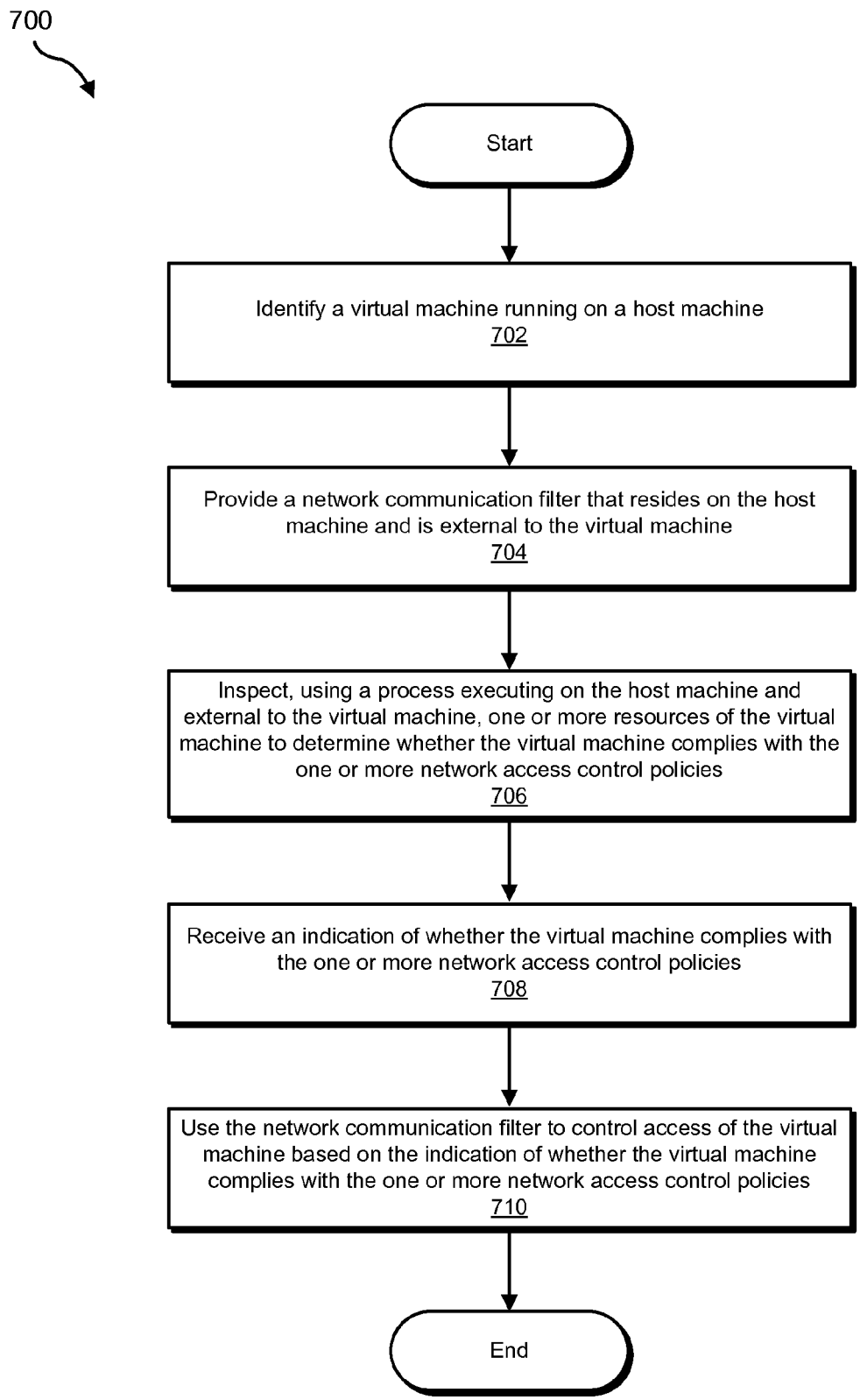
FIG. 7 is a flow diagram of an exemplary method for providing network access control in virtual environments by inspecting virtual machine resources.

The discussion corresponding to FIGS. 2-5 provide examples of using a virtual machine agent to provide network access control for virtual machines. The discussion corresponding to FIGS. 6 and 7 provides examples of agent-less network access control in a virtual environment. FIG. 6 shows an exemplary host machine 602 that includes access-control module 114, network-communication filter 242, agent-provisioning module 112, network-access-control-policies database 132, and an inspection module 604. Inspection module 604 may be programmed to inspect resources of virtual machines to determine whether virtual machines comply with network-access-control policies.

Host machine 602 generally represents any type or form of computing device capable of reading computer-executable instructions. Examples of host machine 602 include, without limitation, laptops, desktops, servers, cellular phones, personal digital assistants (PDAs), multimedia players, embedded systems, combinations of one or more of the same, exemplary computing system 810 in FIG. 8, or any other suitable computing device. Host machine 602 may be programmed to run one or more virtual machines, such as virtual machine 610. Resources of virtual machine 610 may include virtual machine disk space 612 and virtual machine memory space 614.

FIG. 7 is a flow diagram of an exemplary computer-implemented method 700 for providing network access control in virtualized environments. The steps shown in FIG. 7 may be performed by any suitable computer-executable code and/or computing systems. In some embodiments, the steps shown in FIG. 7 may be performed by one or more of the components of system 100 in FIG. 1 and/or system 600 in FIG. 6. At step 702 in FIG. 7, one or more of the systems described herein may identify a virtual machine running on a host machine. For example, access-control module 114 may identify virtual machine 610 running on host machine 602. Access-control module 114 may identify virtual machine 610 in a variety of contexts. For example, access control module 114 may identify virtual machine 610 when virtual machine 610 starts, when virtual machine 610 attempts to communicate over a network, and/or at any other suitable time.

At step 704 in FIG. 7, one or more of the systems described herein may provide a network communication filter that resides on the host machine and is external to the virtual machine. For example, host machine 602 may include network-communication filter 242 configured to control communications from virtual machine 610.

At step 706 in FIG. 7, one or more of the systems described herein may inspect, using a process executing on the host machine and external to the virtual machine, one or more resources on the virtual machine to determine whether the virtual machine complies with one or more network access control policies. For example, inspection module 604 may inspect virtual machine 610 to determine whether virtual machine 610 complies with one or more network access control policies. While inspection module 604 may run completely outside virtual machine 610, inspection module 604 may also run transiently inside virtual machine 610.

Inspection module 604 may inspect any resources of virtual machine 610 to determine whether virtual machine 610 complies with one or more network access control policies. For example, inspection module 604 may inspect virtual machine disk space 612 (e.g., disk blocks) and/or virtual machine memory space 614 (e.g., memory pages) of virtual machine 610 to determine whether virtual machine 610 complies with network access control policies. In such embodiments, inspection module 604 may, based on the inspection of resources of virtual machine 610, reconstruct operating system and/or file system data structures of virtual machine 610. Inspection module 604 may evaluate the reconstructed operating system and/or file system data structures to determine whether virtual machine 610 is network-access-control compliant.

As an example, inspection module 604 may inspect virtual machine disk space 612 of virtual machine 610 to determine whether virtual machine 610 has the appropriate antivirus and/or other security software installed. As another example, inspection module 604 may inspect virtual machine disk space 612 in virtual machine 610 to determine whether virtual machine 610 appears to have been compromised by malware.

At step 708 in FIG. 7, one or more of the systems described herein may receive an indication of whether the virtual machine complies with one or more network access control policies. For example, access-control module 114 may receive an indication from inspection module 604 of whether virtual machine 610 complies with network access control policies defined in network-access-control-policies database 132.

At step 710 in FIG. 7, one or more of the systems described herein use the network-communications filter to control network access of the virtual machine based on indication of whether the virtual machine complies with the one or more network access control policies. For example, access-control module 114 may use network-communication filter 242 to block and/or allow communications from virtual machine 610 based on whether virtual machine 610 complies with network access control policies.

Figure 8:
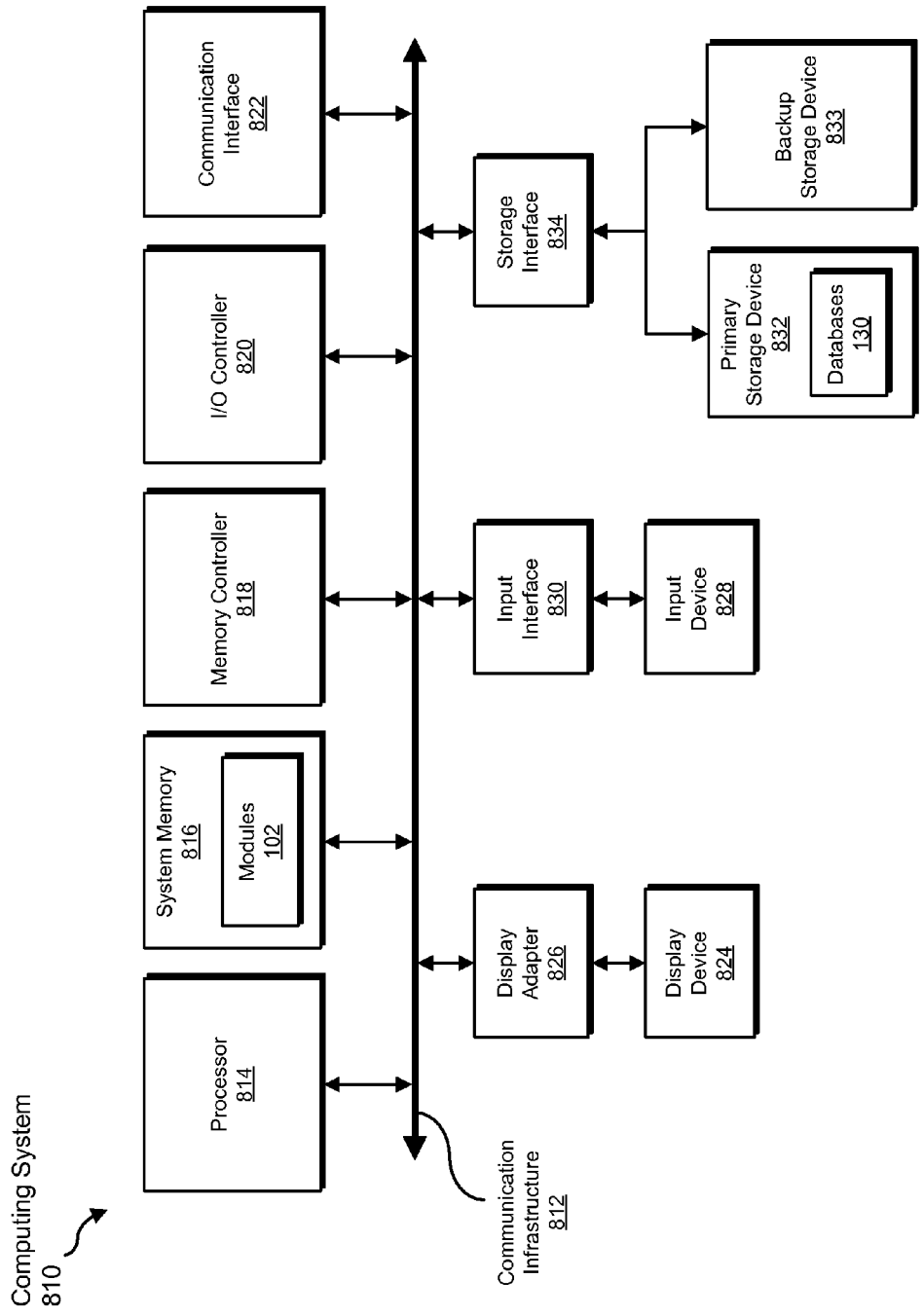
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the injecting, receiving, controlling, inserting, triggering, obtaining, removing, providing, using, remediating, identifying, and/or inspecting steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 110 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller 818 may perform and/or be a means for performing, either alone or in combination with other elements, one or more of the steps or features described and/or illustrated herein, such as injecting, receiving, controlling, inserting, triggering, obtaining, removing, providing, using, remediating, identifying, and/or inspecting.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for performing, either alone or in combination with other elements, one or more of the injecting, receiving, controlling, inserting, triggering, obtaining, removing, providing, using, remediating, identifying, and/or inspecting steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the injecting, receiving, controlling, inserting, triggering, obtaining, removing, providing, using, remediating, identifying, and/or inspecting steps disclosed herein. Communication interface 822 may also be used to perform and/or be a means for performing other steps and features set forth in the instant disclosure.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the injecting, receiving, controlling, inserting, triggering, obtaining, removing, providing, using, remediating, identifying, and/or inspecting steps disclosed herein. Input device 828 may also be used to perform and/or be a means for performing other steps and features set forth in the instant disclosure.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810. In one example, databases 130 from FIG. 1 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

In certain embodiments, storage devices 832 and 833 may be used, for example, to perform and/or be a means for performing, either alone or in combination with other elements, one or more of the injecting, receiving, controlling, inserting, triggering, obtaining, removing, providing, using, remediating, identifying, and/or inspecting steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
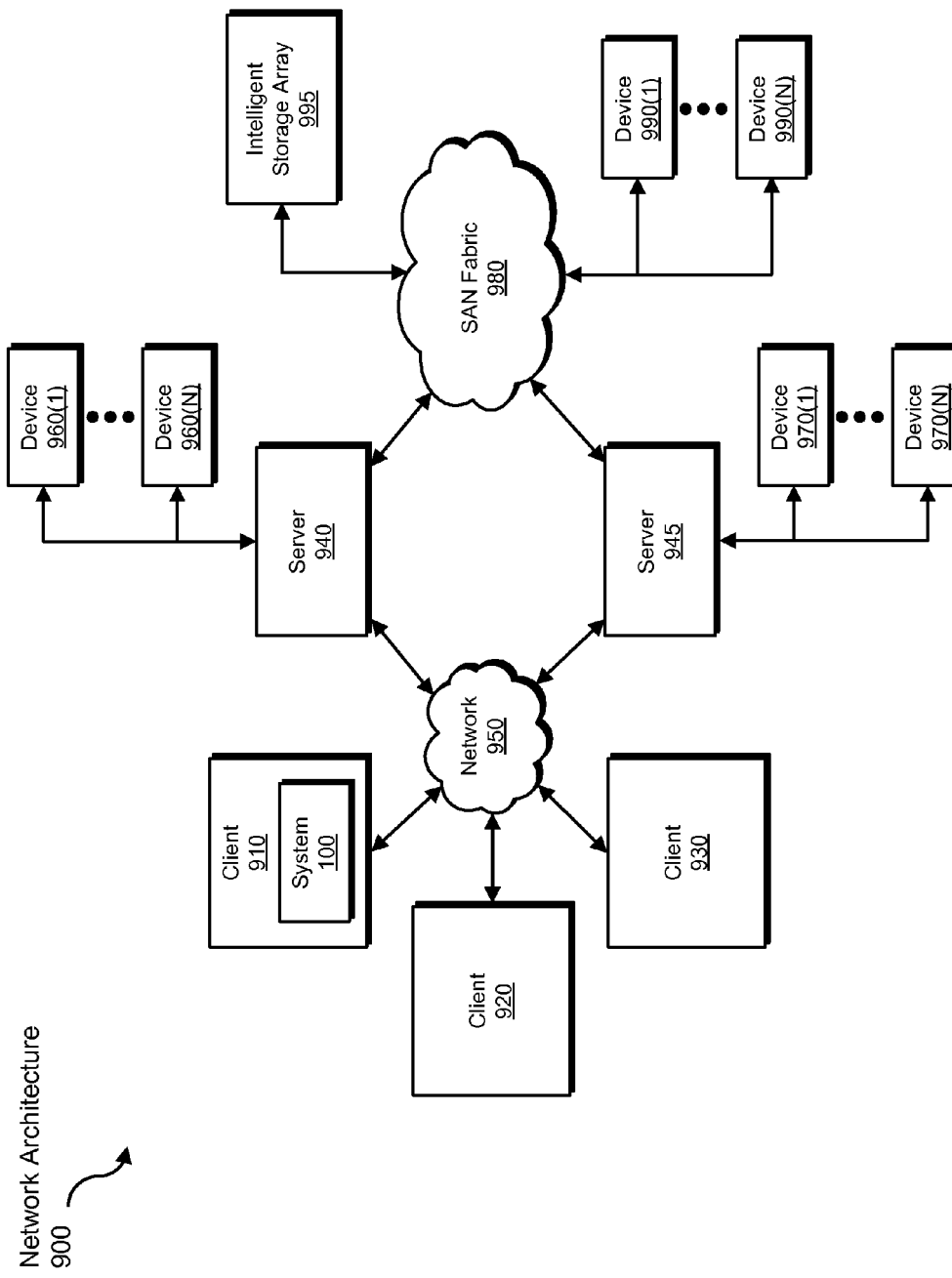
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8. In one example, client system 910 may include system 100 from FIG. 1.

Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for performing, either alone or in combination with other elements, one or more of the injecting, receiving, controlling, inserting, triggering, obtaining, removing, providing, using, remediating, identifying, and/or inspecting steps disclosed herein. Network architecture 900 may also be used to perform and/or be a means for performing other steps and features set forth in the instant disclosure.

As detailed above, computing system 810 and/or one or more components of network architecture 900 may perform and/or be a means for performing, either alone or in combination with other elements, one or more steps of an exemplary method for providing network access control in virtual environments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules disclosed herein may transform a host device into a network access control server by filtering communications of a virtual machine on the host device with a network communication filter.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing network access control in virtual environments, at least a portion of the method being performed by a computing device comprising at least one processor, the method comprising:
    transferring control of a virtual machine that is running on a host machine to an agent-insertion module;
    using the agent-insertion module to allocate a memory region of the virtual machine to a transient security agent;
    injecting the transient security agent into the allocated memory region of the virtual machine;
    receiving, from the transient security agent, an indication of whether the virtual machine complies with one or more network access control policies;
    controlling network access of the virtual machine based on the indication of whether the virtual machine complies with the one or more network access control policies;
    remediating the virtual machine by allowing the virtual machine access to one or more network resources used to remediate the virtual machine and blocking access to one or more other network resources.

2. The method of claim 1, wherein:
    the indication of whether the virtual machine complies with the one or more network access policies is received using a virtual switch comprising a logical switching fabric.

3. The method of claim 1, wherein transferring control of the virtual machine to the agent-insertion module comprises:
    inserting, into an exception handler memory location of the virtual machine, one or more computer-executable instructions configured to facilitate transfer of control from the virtual machine to the agent-insertion module;
    triggering an exception during execution of the virtual machine to cause the one or more computer-executable instructions in the exception handler memory location to be executed;
    transferring control of the virtual machine to the agent-insertion module after the one or more computer-executable instructions execute.

4. The method of claim 3, wherein:
    the computer-executable instructions configured to facilitate transfer of control from the virtual machine comprise an instruction with an invalid opcode;
    triggering the exception during the execution of the virtual machine comprises triggering an invalid opcode exception.

5. The method of claim 1, wherein:
    the indication of whether the virtual machine complies with the one or more network access control policies is received at a network access control module on the host machine;
    the indication of whether the virtual machine complies with the one or more network access control policies is sent to the network access control module via an interprocess communication;
    the network access control module comprises a network communication filter that controls network access of the virtual machine based on the indication of whether the virtual machine complies with the one or more network access control policies.

6. The method of claim 1, wherein:
the indication of whether the virtual machine complies with the one or more network access control policies is received at a network access control server that is remote from the host machine;
the network access control server controls network access of the virtual machine based on the indication of whether the virtual machine complies with the one or more network access control policies.

7. The method of claim 1, further comprising:
removing the transient security agent from the virtual machine.

8. The method of claim 7, wherein:
the transient security agent is removed from the virtual machine after receiving the indication of whether the virtual machine complies with one or more network access control policies.

9. The method of claim 7, wherein:
the transient security agent is removed from the virtual machine when the virtual machine no longer needs network access.

10. The method of claim 1, tangibly embodied as computer-executable instructions on at least one non-transitory computer-readable-storage medium.

11. A computer-implemented method for providing network access control in virtual environments, at least a portion of the method being performed by a computing device comprising at least one processor, the method comprising:
providing a security agent in a user virtual machine that is running on a host machine;
providing a network communication filter that resides on the host machine but is external to the user virtual machine;
providing an access control module in a network access control virtual machine that is running on the host machine, wherein the access control module controls the network communication filter;
receiving, at the access control module, using a memory page that is accessible by both the security agent and the access control module, an indication that the user virtual machine does not comply with one or more network access control policies;
using the network communication filter to control network access of the user virtual machine based on the indication of non-compliance by blocking one or more network communications of the user virtual machine.

12. The method of claim 11, wherein:
providing the security agent in the user virtual machine comprises prompting the user virtual machine to install the security agent.

13. The method of claim 11, wherein:
providing the security agent in the user virtual machine comprises installing the security agent on the user virtual machine;
the security agent is installed on the user virtual machine using an installation process of the user virtual machine.

14. The method of claim 11, further comprising:
remediating the user virtual machine to bring the user virtual machine into compliance with the one or more network access control policies, wherein the network communication filter allows the user virtual machine access to one or more network resources used to remediate the user virtual machine.

15. The method of claim 14, wherein:
the network communication filter allows the user virtual machine access to one or more network resources used to remediate the user virtual machine by allowing the user virtual machine to connect to a quarantine server that provides software and patches.

16. The method of claim 11, wherein the network access control virtual machine includes both a user level and a kernel level.

17. A non-transitory computer-readable-storage medium comprising one or more computer-executable instructions that, when executed by at least one processor of a computing device, cause the computing device to:
provide a security agent in a user virtual machine that is running on a host machine;
provide a network communication filter that resides on the host machine and is external to the user virtual machine;
provide an access control module in a network access control virtual machine that is running on the host machine, wherein the access control module controls the network communication filter;
receive, at the access control module, using a memory page that is accessible by both the security agent and the access control module, an indication that the user virtual machine does not comply with one or more network access control policies;
use the network communication filter to control network access of the user virtual machine based on the indication of non-compliance by blocking one or more network communications of the user virtual machine.

18. The non-transitory computer-readable-storage medium of claim 17, wherein the one or more computer-executable instructions further cause the computing device to provide the security agent in the user virtual machine at least in part by prompting the user virtual machine to install the security agent.

19. The non-transitory computer-readable-storage medium of claim 17, wherein:
the one or more computer-executable instructions further cause the computing device to provide the security agent in the user virtual machine at least in part by installing the security agent on the user virtual machine;
the security agent is installed on the user virtual machine using an installation process of the user virtual machine.

20. The non-transitory computer-readable-storage medium of claim 17, wherein the one or more computer-executable instructions further cause the computing device to remediate the user virtual machine to bring the user virtual machine into compliance with the one or more network access control policies, wherein the network communication filter allows the user virtual machine access to one or more network resources used to remediate the user virtual machine.

* * * * *